United States Patent [19]

Flodman et al.

[11] Patent Number: 4,954,581

[45] Date of Patent: Sep. 4, 1990

[54] AMINO RESIN AND A METHOD FOR ITS PRODUCTION

[75] Inventors: Leif A. Flodman, Sundsvall; Per E. G. Gabrielsson, Kvissleby, both of Sweden

[73] Assignee: Dynobel A/S, Stockholm, Sweden

[21] Appl. No.: 362,684

[22] Filed: Jun. 6, 1989

Related U.S. Application Data

[62] Division of Ser. No. 147,298, Jan. 22, 1988, Pat. No. 4,857,609.

[30] Foreign Application Priority Data

Jan. 26, 1987 [SE] Sweden .................................. 8700292
Dec. 1, 1987 [SE] Sweden .................................. 8704793

[51] Int. Cl.$^5$ ............................................. C08L 61/00
[52] U.S. Cl. ............................. 525/497; 156/331.3; 156/335; 524/541; 525/495; 525/498
[58] Field of Search ............... 525/497, 498, 495, 516; 528/163, 164; 524/541

[56] References Cited

U.S. PATENT DOCUMENTS

| | | | |
|---|---|---|---|
| 3,734,918 | 5/1973 | Mayer et al. | 260/293 |
| 4,458,049 | 7/1984 | Diem et al. | 524/595 |

FOREIGN PATENT DOCUMENTS

| | | |
|---|---|---|
| 69267 | 1/1983 | European Pat. Off. . |
| 83523 | 7/1983 | European Pat. Off. . |
| 152318 | 8/1985 | European Pat. Off. . |
| 190068 | 8/1986 | European Pat. Off. . |
| 253488 | 1/1988 | European Pat. Off. . |
| 590305 | 8/1987 | Switzerland . |
| 2027439 | 2/1980 | United Kingdom . |

*Primary Examiner*—Morton Foelak
*Assistant Examiner*—Anang Sridharan
*Attorney, Agent, or Firm*—Burns, Doane, Swecker & Mathis

[57] ABSTRACT

The invention relates to a resin for the production of cellulose based products, such as particle boards. The resin is a condensation product of formaldehyde, urea and phenol and optionally melamine with a molar ratio of 1.4–0.8 moles of urea, 0.006–0.04 moles of phenol and 0–0.04 moles of melamine per mole formaldehyde. The invention also relates to a method of producing such a resin. According to the method a separately prepared cross-linking agent containing a co-condensate of phenol, formaldehyde and urea or containing a co-condensate of phenol and formaldehyde together with urea, is added to a pre-condensate of formaldehyde, urea and optionally melamine, whereafter the mixture is condensed. As an alternative the cross-linking agent can be added to a finished condensate of formaldehyde, urea and optionally melamine.

The invention also relates to a method of manufacturing glued cellulose based products.

1 Claim, No Drawings

AMINO RESIN AND A METHOD FOR ITS PRODUCTION

This application is a divisional of application Ser. No. 147,298, filed Jan. 22, 1988, now U.S. Pat. No. 4,857,609.

The present invention relates to a resin for the production of an adhesive for cellulose based products and to a method for production of the resin. The invention also relates to a process for the production of glued wood products.

At the production of wood products, for example particle board, wood fibre board, plywood etc., binders based on amino resins are usually used and, among these, mainly urea-formaldehyde resins. It is well known that the release of formaldehyde, originating from the amino resin adhesives, from glued wood products causes serious problems. Authorities in different countries have made the limits for the level of formaldehyde in living environments severer. Since a great amount of structural elements consist of glued construction materials these restrictions makes the production of adhesives with lower formaldehyde emission necessary. The producers of adhesives have made great efforts to reduce the formaldehyde emission. Several patents and patent applications disclose different production processes for amino resins of varying compositions, which processes are said to give resins which give a low release of formaldehyde at gluing and from the finished products. The EP patent application 190068, for example, relates to a process for the production of an amino resin based adhesive for wood products with low release of formaldehyde. The process relates to condensation of the components formaldehyde, urea, melamine and phenol in several stages, in a fixed sequence.

For conventional urea-formaldehyde resins it is necessary that the molar ratio urea:formaldehyde is kept higher than about 1:1.2 in order to achieve a satisfactory strength of the finished wood products. It is known that a lowered molar ratio between formaldehyde and urea (F/U) gives a decreased formaldehyde emission from board materials glued with pure UF-resins. However, it is also known that this leads to other disadvantages of the finished board material, for example an increased swelling, impaired strength properties and, in certain cases, an increased brittleness. Manufacturers of particle board have noted that these adhesives are more susceptible to variations in the production conditions, e.g. increased moisture content of the chips, that longer press times are required, that there is risk of drying out of glued chips and also that an increased glue addition often is required.

An important factor resulting in these disadvantages at low molar ratios is a decreased degree of cross-linking. At lower molar ratios resins do, to a certain extent, begin to become more and more linear in their structure, compare novolacs of phenol resins.

It is known to use melamine to cross-link such resins. By increasing the degree of cross-linking of the resin, the swelling of boards glued with such resins will decrease and the strength will increase.

Several resins are made with an addition of phenol to the urea-formaldehyde resin to improve the properties. The additions are generally large and are usually made together with a large part of melamine. These resins consist mainly of a mixture of urea-formaldehyde resin and phenol-formaldehyde resin, although the phenol is added during the reaction process. This is due to the fact that urea and phenol will only react with substantial yields if certain conditions are fulfilled. A co-condensation of phenol, formaldehyde and urea is only obtained if methylol phenol is reacted with an excess of urea at an acid pH. If a mixture of urea and phenol is reacted with formaldehyde, no substantial yield of a co-condensate is obtained either at an acid or alkaline pH. Nor is there a co-condensation when methylol urea is reacted with an excess of phenol at different pH values. At an alkaline pH the methylol group is dissociated from the methylol urea. The obtained formaldehyde is added to the phenol which then condensates with itself. At an acid pH the self-condensation of the urea is the dominating reaction. The reaction between urea and methylol phenol has been confirmed by $^{13}$C-NMR.

It has now been found that this so-called phenol/urea co-condensate with its free amide- and methylol groups more simply, and in a better way, makes it possible to react a phenol, in derivatized form, into a pre-condensate consisting mainly of formaldehyde and urea and optionally a smaller amount of melamine.

The present invention thus relates to a resin with a low molar ratio between formaldehyde and urea which gives a low formaldehyde emission at the production of the glued wood products and from finished such products.

The resin and the process for its production as well as the process for the production of the glued wood products are evident from the patent claims.

The resin consists of a condensation product of formaldehyde, urea and phenol. It is prepared from a pre-condensate of formaldehyde and urea. A cross-linking agent is added to the pre-condensate and the cross-linking agent contains a co-condensate of phenol and urea or methylol phenol and urea. By addition of this reagent an increased degree of cross-linking is obtained despite a low molar ratio (F/U). The strength properties of the glued wood products are increased in comparison with a resin having the same molar ratio (F/U) but without cross-linking reagent. Also other, above mentioned, disadvantages are minimized/eliminated. To further reduce the swelling of finished board materials smaller amounts of melamine can be present in the resin, which increases the cross-linking of this. When melamine is present it is included in the pre-condensate.

The addition of the phenol/urea cross-linking agent is made in the process step wherein the resin shall be condensed, i.e. at an acid pH. The mentioned cross-linking agent can thus also be co-reacted. The process can be described by the following diagram:

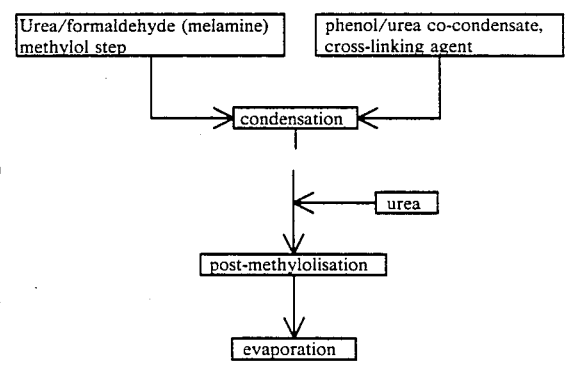

Even when the cross-linking agent is added in the form of methylol phenol and corresponding amount of urea as in the phenol/urea co-condensate above, the addition is made in the process step wherein the resin shall be condensed, i.e. at an acid pH. The reaction between methylol phenol and urea to a cross-linking reagent occurs at the same time during the condensation process for the urea-formaldehyde resin. The urea reacts preferentially with the methylol phenol. This process can be described by the following diagram:

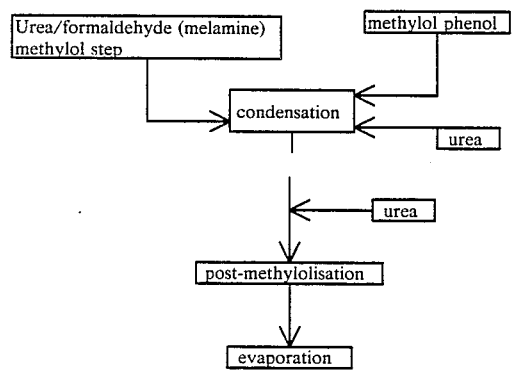

Resin produced in the above described manner and with this cross-linking reagent obtains improved properties. The gel time and the gelling process become more distinct (rapid hardening). Boards produced with this resin will get a lower swelling and increased strength compared with a resin without cross-linking agent. The formaldehyde emission is as low as for corresponding resins of low molar ratios, i.e. it fulfills the German E1 requirement $\leq 10$ mg $CH_2O/100$ g particle board. This cross-linking agent, the phenol/urea co-condensate also allows the melamine content to be kept low.

According to a further embodiment of the invention a cross-linking agent in the form of a phenol/urea co-condensate or a methylol phenol is added after the evaporation of the condensed urea (melamine) formaldehyde reaction mixture, i.e. to the finished urea (melamine) formaldehyde condensate. In this method the additions of urea are carried out in the same way as above, i.e. to the condensation step and after that. At addition to this finished condensate, the acid conditions which the cross-linking agent needs to react, are obtained by addition of the acid hardener to the resin. At the production of particle boards, the acid particles also contribute to the acid environment. When hardening the resin in the board, the methylol phenol is able to react with free urea present in the resin and is able to be reacted into the resin. The process can be described by the following diagram:

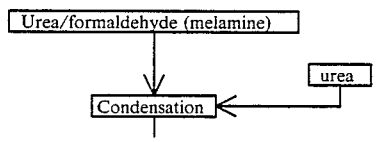

-continued

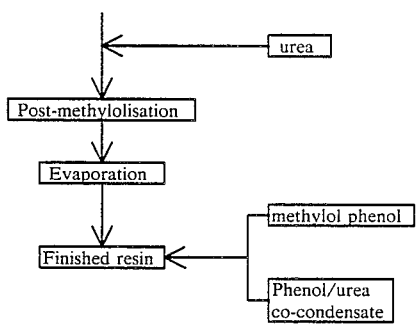

This process has certain industrial and technical advantages compared with the two other processes. It has surprisingly been found that in spite of this method allowing for a very short time of reaction of the cross-linking agent and in spite of that this reaction is not carried out with a pre-condensate of urea and formaldehyde, but with a more condensed urea formaldehyde condensate, very good properties of the boards manufactured with this resin are obtained. The boards will get as good strength properties and as low emission of formaldehyde as boards manufactured with resins produced according to the first described processes. However, somewhat inferior swelling properties are obtained.

The invention also relates to the use of methylol phenol or phenol/urea co-condensate, prepared according to the above, as cross-linking agent, at an acid pH, for urea-formaldehyde condensates, which optionally contain melamine.

The resin produced according to the above methods can be mixed with a conventional melamine resin for production of an adhesive for manufacturing of moisture resistant wood products for exterior use. A suitable conventional melamine resin has a molar ratio formaldehyde:melamine of 1.7-2.4, preferably 1.8-2.1. 30-70 per cent by weight of the melamine resin are mixed with 70-30 per cent by weight of the urea phenol resin according to the invention. If the process with addition of the cross-linking agent to the finished urea (melamine) formaldehyde condensate is used when producing the resin, the cross-linking agent can be added to the melamine resin in stead of the finished condensate.

At the production of resin according to the present invention a pre-condensate of urea and formaldehyde, and optionally a minor amount of melamine, is first prepared by a methylolisation step. Methylolisation step is intended to mean addition of formaldehyde to urea, melamine and phenol, respectively, for formation of methylol monomers. The molar ratio urea/formaldehyde is 0.15 to 1 mole of urea/mole formaldehyde, suitably 0.25 to 0.75 and preferably 0.3 to 0.4. The mole ratio melamine/formaldehyde is 0 to 0.04, suitably 0.006 to 0.027 moles of melamine/mole formaldehyde. The reaction is carried out at a temperature of from 75 to 90° C. and at a pH of from 8.0 to 8.6, preferably from 8.2 to 8.4.

The cross-linking agent in the form of a phenol/urea co-condensate is produced by methylolisation of phenol at a pH of from 8.5 to 9.0, preferably form 8.7 to 8.9 and at a temperature of from 50 to 70° C. Urea is then added and the temperature raised to 70 to 90° C. and the reaction is allowed to take place at a pH of from 4 to 6, preferably from 4.7 to 4.9. The molar ratio phenol/formaldehyde is from 3.3 to 0.1, preferably from 0.3 to 0.7 moles of phenol/mole formaldehyde and the molar ratio urea/phenol is 1 to 10, preferably 3.5 to 6.5 moles of urea/mole phenol.

This cross-linking agent is added to the pre-condensate and the pH is adjusted to 4 to 7, suitably to 4.5 to 5.5 and preferably to 4.8 to 5.0 and the condensation takes place at 75 to 85° C. to a suitable viscosity. The viscosity varies depending on the concentration of the formaldehyde and the viscosity which is desired by the user of the resin. The viscosity is usually within the range of from 200 to 1500 mPa.s at 20° C. A suitable viscosity at formaldehyde of 50% can be from 200 to 250 mPa.s. The reaction is stopped by raising the pH to 7.5 to 8.0. Further urea is then added for post-methylolisation in a known manner. The molar ratio in the final resin will be 1.4 to 0.8 moles of urea/ mole formaldehyde, suitably 1.05 to 0.9 and preferably 0.97 to 0.93, 0 to 0.04 moles of melamine/mole formaldehyde, suitably 0.006 to 0.027, 0.006 to 0.04 moles of phenol/mole formaldehyde, preferably 0.01 to 0.03.

Alternatively the following are added to the precondensate, a cross-linking agent in the form of methylol phenol (prepared with a molar ratio of 3.3 to 0.1, preferably 0.3 to 0.7, moles of phenol/mole formaldehyde) and, separately, 1 to 10, preferably 3.5 to 6.5 moles of urea (per mole of phenol). The reaction is carried out as above and the obtained resin has the same molar ratio as above.

At the production according to the third method a similar pre-condensate as in the two other methods is prepared. To this pre-condensate 1-10 moles of urea (calculated per mole of phenol) are added, preferably 3.5-6.5 moles. The reaction is then carried out in the same way as earlier. After evaporation of the condensate a cross-linking agent in the form of methylol phenol (prepared with the same mole ratio as above) is added to the condensate. When phenol/urea co-condensate (prepared in the same way as above and thus containing 1-10 moles of urea) is used as cross-linking agent a part of the urea which is added for post-methylolisation is redistributed. A part of that urea is added to the pre-condensate, whereafter the condensing is carried out in the same way as earlier. The resin mixtures prepared in this way will get the same final molar ratio as the earlier prepared resins.

At the production of particle board with the present resins conventional production processes are used. The originally very moist chips are dried to such a dry content that the total moisture content after the addition of the adhesive does not exceed the critical limit for steam blister. To decrease the susceptibility to moisture a hydrophobing agent is added such as a mineral wax or a natural or synthetic paraffin wax. If desired known formaldehyde binding agent, such as urea, can be added together with the hydrophobing agent. When the dry chips have been glued they are pressed at press temperature of about 185 to 220° C. The amount of added adhesive is normally between 7 and 12 per cent dry resin based on the weight of dry chips. A conventional hardener is used, such as ammonium chloride, ammonium sulphate, suitable inorganic and organic acids. The press times are in the range of from 8 to 12 s/mm particle board. The invention is illustrated in the following examples.

EXAMPLE 1.

Resin for boards for indoor use

Methylolisation step:

A reaction mixture of 4386 g of 50% formalin is reacted with 1462 g of urea and 113 g of melamine. At the addition the temperature is about 50° C. The temperature of the reaction mixture is raised to 80° C., the pH is adjusted to 8.2–8.4.

The reaction is carried out for 20 minutes. The molar ratio is then lowered by adding 390 g of urea. The reaction is then allowed to go on for another 15 minutes.
Condensation:

To the above mentioned reaction mixture an earlier prepared phenol/urea co-condensate is added (after 35 minutes) and the pH is adjusted to 4.8–5.0.

The reaction mixture is allowed to condense at 78° C. until a viscosity of 230–250 mPas (25° C.) is obtained. The reaction is stopped with sodium hydroxide (pH=7.5−8.0) and 1836 g of additional urea are added. The resin is evaporated and cooled to room temperature.

The mentioned phenol/urea co-condensate is manufactured according to the following method: 120 g of 50% of formalin, 94 g of phenol and 100 g of water are added to a flask. The pH is adjusted to 8.7–8.9 and the temperature is kept at 60° C. for 60 minutes. 300 g of urea and 150 g of water are then added to the methylol phenol. The temperature is raised to 80° C. and the reaction time is 60 minutes at pH 4.7–4.9.

EXAMPLE 2.

Resin for boards for indoor use

Methylolisation step:

The methylolisation step is carried out in the same way as in example 1.
Condensation:

An acidified methylol phenol (f/p=2.0), 300 g of urea and 150 g of water are then added to the reaction mixture. The pH is lowered to 4.8–5.0.

The reaction mixture is condensed at about 80° C. to 230–250 mPas (25° C.), the reaction is then stopped with sodium hydroxide (pH=7.5−8.0) and 2148 g of additional urea are added. The resin is evaporated to 65% and is finally cooled to room temperature.
Resin data:

| Resin data: | |
|---|---|
| Viscosity 25° C. mPas | 273 |
| pH | 8.7 |
| Gel time 100° C. (2% NH4Cl, atro Cl) | 78 |
| (atro = absolutely dry NH4Cl/absolutely dry resin) | |
| Density | 1.28 |
| Dry content, % | 65 |
| Dilutability, 25° C. water | 1 + 3.0 |

These resins have then been used for manufacturing particle boards. The following conditions of manufacturing have been used:

| | |
|---|---|
| Press-temperature | 185° C. |
| Press-time | 3.3–3.0–2.7–2.4 min |
| Thickness of board | 16 mm |
| Size | 330 × 500 mm |
| Type | 3 layer |
| Dosage of glue | 11/8% surface/core- |

-continued

| | layer |
|---|---|
| Dosage of hardener NH4Cl | 0.7/3.0 atro resin |
| Dosage of wax | 0.5/0.5% |

| Resin | Press-time | Density kg/m³ | MOR MPa | IB MPa | Swelling/water abs 2 h S %* | 2 h A %* | 24 h S %* | 24 h %* |
|---|---|---|---|---|---|---|---|---|
| Ex 1 | 3,3 | 727 | 19,7 | 0,59 | 3,0 | 10,9 | 15,5 | 36,6 |
| " | 3,0 | 723 | 17,8 | 0,59 | 2,7 | 9,8 | 13,8 | 32,8 |
| " | 2,7 | 706 | 16,7 | 0,52 | 2,7 | 10,3 | 14,0 | 33,7 |
| " | 2,4 | 700 | 16,4 | 0,51 | 2,3 | 10,2 | 13,4 | 33,5 |
| Ex 2 | 3,3 | 695 | 16,5 | 0,58 | 2,6 | 10,5 | 14,3 | 34,1 |
| " | 3,0 | 717 | 19,4 | 0,56 | 2,4 | 10,2 | 13,0 | 33,7 |
| " | 2,7 | 676 | 14,7 | 0,58 | 2,4 | 10,4 | 13,0 | 34,1 |
| " | 2,4 | 694 | 15,6 | 0,52 | 2,2 | 9,7 | 12,1 | 31,3 |
| Commercial¹ resin | 3,3 | 691 | 14,5 | 0,60 | 3,7 | 10,6 | 15,2 | 36,1 |
| Commercial¹ resin | 3,0 | 747 | 19,1 | 0,64 | 3,3 | 8,8 | 13,7 | 30,7 |
| Commercial¹ resin | 2,7 | 728 | 17,6 | 0,64 | 3,2 | 9,0 | 13,0 | 31,5 |
| Commercial¹ resin | 2,4 | 696 | 15,6 | 0,56 | 3,4 | 10,1 | 13,9 | 34,2 |

*S = Swelling A = Absorption
¹As commercial resin has been used a urea-formaldehyde resin with F:U = 1.19 (Casco UF 1145).

The boards were also tested for their contents and emission of free formaldehyde.

| Resin | Press-time min | WKI[2] mg CH₂O/m² board and 24h | Perforator[3] mg CH₂O/100 g sample of board and 24h | Dry content % |
|---|---|---|---|---|
| Ex 1 | 3,3 | 58 | 8,0 | 93,3 |
| " | 2,7 | 61 | 8,1 | 92,9 |
| Ex 2 | 3,3 | 71 | 8,1 | 92,9 |
| " | 2,7 | 70 | 9,0 | 92,6 |
| Commercial[1] resin | 3,3 | 91 | 16,0 | 92,7 |
| Commercial[1] resin | 2,7 | 88 | 16,0 | 92,4 |

[1]As commercial resin has been used a urea-formaldehyde resin with F:U = 1.19 (Casco UF 1145).
[2]WKI = Modified Roffael-method according to WKI-bericht nr13, but further modified by Casco Nobel
[3]Perforator value according to EN = 120

(1) As commercial resin has been used a urea-formaldehyde resin with F:U=1.19 (Casco UF 1145). (2) WKI=Modified Roffael-method according to WKI-bericht nr13, but further modified by Casco Nobel (3) Perforator value according to EN=120
The limit for particle boards according to the E1 requirement calculated with the Perforator method, is 10 mg/100 g of particle board and calculated with a method similar to the modified WKI=80 mg/m² of board and twenty-four hours.

From the above table it is evident that all the boards with resins according to the present invention meet these requirements which, on the contrary, the reference resin does not. The strength of boards produced with the present resins is, however, comparable with the one of the reference resin.

EXAMPLE 3.

Methylolisation step:
The methylolisation step is carried out in the same way as in example 1.
Condensation:
300 g of urea and 150 g of water are added to the reaction mixture (F/U=2.0). The pH of the reaction mixture is lowered to 4.8–5.0. The temperature is raised to about 80° C. and the condensation is allowed to go on to a viscosity of about 300–320 mPas (25° C.). The reaction is then stopped with sodium hydroxide (pH=7.5–8.0) and 2148 g of additional urea are added. The condensate is evaporated to 65%. After the evaporation the cross-linking agent methylol phenol (314 g) (F/P=2.0) is added and the resin solution is finally cooled to room temperature.
Resin data:

| Resin data: | |
|---|---|
| Viscosity 25° C., mPas | 254 |
| pH | 9.3 |
| Gel time 100° C., 2% NH4Cl atro resin | 53 |
| Density 25° C., kg/m³ | 1280 |
| Dry content, % | 64.7 |
| Dilutability 25° C. water | 1 + 2.9 |

The resin has then been used for manufacturing particle boards with conditions identical to those in example 2.
Results:

| Resin | Press-time min | Density kg/m³ | MOR MPa | IB MPa | Swelling/water abs 2 h S %* | 2 h A %* | 24 h S %* | 24 h A %* |
|---|---|---|---|---|---|---|---|---|
| Ex 3 | 3.3 | 663 | 19.9 | 0.50 | 4.0 | 13.6 | 16.9 | 42.5 |
| " | 3.0 | 675 | 20.0 | 0.45 | 4.8 | 13.1 | 18.7 | 43.1 |
| " | 2.7 | 660 | 19.5 | 0.34 | 4.5 | 13.4 | 17.8 | 43.2 |
| " | 2.4 | 630 | 18.6 | 0.38 | 4.2 | 13.4 | 15.7 | 42.9 |
| Commercial[1] resin | 3.3 | 637 | 16.0 | 0.48 | 4.1 | 12.9 | 15.4 | 41.0 |
| Commercial[1] resin | 3.0 | 664 | 20.7 | 0.47 | 4.4 | 13.6 | 27.0 | 44.1 |
| Commercial[1] resin | 2.7 | 631 | 16.1 | 0.42 | 4.2 | 11.9 | 15.9 | 38.7 |

-continued

| Resin | Press-time min | Density kg/m³ | MOR MPa | IB MPa | Swelling/water abs | | | |
|---|---|---|---|---|---|---|---|---|
| | | | | | 2 h | | 24 h | |
| | | | | | S %* | A %* | S %* | A %* |
| resin Commercial[1] resin | 2.4 | 641 | 16.5 | 0.33 | 5.0 | 14.9 | 17.3 | 45.6 |

S = swelling
A = absorption
[1] F/U 1.2

EXAMPLE 4.

Urea/phenol co-condensate is added after evaporation.
Phenol/urea co-condensate:

The separately prepared phenol/urea co-condensate can be added in a similar way as in example 3, i.e. after evaporation. 120 g of 50% formalin, 94 g of phenol and 100 g of water are added to a flask. The pH is adjusted to 8.7–8.9 and the temperature is kept at 60° C. for 60 minutes. 300 g of urea and 150 g of water are then added to the methylol phenol. The reaction mixture is allowed to react at 80° C. for 60 minutes at pH 4.7–4.9.

Parallel to this the other resin component is prepared according to the following:
Methylolisation step:
Is carried out in the same way and with the same amounts as in example 1.
Condensation step:

To the reaction mixture from the methylolisation step 300 g of urea are added, which have been redistributed from the last urea addition and the pH is lowered to 4.8–5.0. The reaction mixture is condensed according to example 2 at 80° C. to 230–250 mPas 25° C. The reaction is stopped with sodium hydroxide to pH 7.5–8.0 and additional urea is added 2148–300 g. The resin is evaporated to such a dry content that at addition of the separately prepared phenol/urea co-condensate (764 g), the dry content will be about 65% in the finished resin.

We claim:

1. A process for the production of glued cellulose based products, such as particle boards, characterized in that the products are glued with an adhesive of which the resin component is a condensation product of formaldehyde, urea, phenol and optionally melamine with a molar ratio per mole formaldehyde of 1.4–0.8 moles of urea, 0.006–0.04 moles of phenol and 0–0.04 moles of melamine.

* * * * *